(12) United States Patent
Hamm et al.

(10) Patent No.: US 7,324,052 B2
(45) Date of Patent: Jan. 29, 2008

(54) ANTENNA FOR A MOBILE TRANSMITTER AND/OR RECEIVER DEVICE

(75) Inventors: Dirk Hamm, Willich (DE); Marc Lenkeit, Willich (DE)

(73) Assignee: Success Chip Ltd., Tortola (VG)

( * ) Notice: Subject to any disclaimer, the term of this patent is extended or adjusted under 35 U.S.C. 154(b) by 18 days.

(21) Appl. No.: 11/037,520

(22) Filed: Jan. 18, 2005

(65) Prior Publication Data

US 2006/0152418 A1   Jul. 13, 2006

(30) Foreign Application Priority Data

Jan. 7, 2005  (EP)  .................................. 05000255

(51) Int. Cl.
*H01Q 1/24* (2006.01)
(52) U.S. Cl. ............................. 343/702; 343/700 MS
(58) Field of Classification Search ................ 343/702, 343/700 MS, 725, 727
See application file for complete search history.

(56) References Cited

U.S. PATENT DOCUMENTS

| | | | | |
|---|---|---|---|---|
| 6,160,512 A * | 12/2000 | Desclos et al. | ...... | 343/700 MS |
| 6,452,558 B1 * | 9/2002 | Saitou et al. | ............... | 343/725 |
| 6,507,318 B2 * | 1/2003 | Ito et al. | ..................... | 343/702 |
| 6,529,168 B2 * | 3/2003 | Mikkola et al. | ............ | 343/702 |
| 7,068,228 B2 * | 6/2006 | Soutome | ..................... | 343/702 |
| 7,075,487 B2 * | 7/2006 | Mattsson et al. | ........... | 343/702 |
| 2003/0048227 A1 * | 3/2003 | Nakamura | .................. | 343/702 |

* cited by examiner

*Primary Examiner*—Tan Ho
(74) *Attorney, Agent, or Firm*—Stoel Rives LLP

(57) ABSTRACT

An antenna for a mobile transmitter and/or receiver device suitable for a hand-held transmitter/receiver for a wireless microphone includes a monopole or dipole antenna element for the excitation of a monopole or diopole and an additional antenna element for the excitation of a parallel line mode.

14 Claims, 5 Drawing Sheets

Theta = 90° ------
Theta = 0° ··········

Phi = 0° ------
Phi = 90° ··········

ANTENNA FOR A MOBILE TRANSMITTER AND/OR RECEIVER DEVICE

CROSS REFERENCES TO RELATED APPLICATIONS

Not Applicable

STATEMENT REGARDING FEDERALLY SPONSORED RESEARCH

Not Applicable.

BACKGROUND OF THE INVENTION

1. Field of the Invention

This invention relates to an antenna for a mobile transmitter and/or receiver device, in particularly for a hand-held transmitter/receiver for a wireless microphone, with a monopole or dipole antenna element.

2. Description of the Prior Art

The prior art describes a number of different antenna concepts for mobile transmitter/receiver devices. Because of the limited amount of energy (battery) that is available, the goal of these antenna concepts is to maximize the radiation efficiency with the most compact antenna possible, or with a form factor that is optimally adapted to the overall unit. Examples of antenna concepts of this type are helix, inverted-L or inverted-F antennas, as well as dipole and monopole antennas.

The dipole and monopole antennas often form a dipole in which a first arm of the antenna is formed by an electrical conductor (e.g. a connecting piece between the housing and the printed circuit board and a grip of the mobile transmitter and/or receiver device) (monopole), and a second arm is formed by a virtual electrical mirror image with inverted polarity of the first arm (of the monopole antenna) in one or more electrical reference planes (e.g. the ground plane(s) in a circuit board or in circuit boards, which can also house the electronics. These circuit boards, for example, can on one hand lie in the same axis as the grip and on the other hand can be perpendicular to the housing connecting piece, and thereby fix an essential part of the monopole antenna in position. In this configuration, the feed point of the antenna lies between the grip and printed circuit board in the connecting piece.

SUMMARY OF THE INVENTION

One object of this invention is to create an antenna of the type described above with an improved antenna efficiency. One embodiment of the invention achieves a highly isotropic radiation distribution, as well as, good tuning over a large bandwidth. One embodiment of the invention also reduces the influence on the antenna parameters when the grip is touched by the user.

This object can be accomplished, in one form, by providing an antenna for a mobile transmitter and/or receiver device, in particular for a hand-held transmitter/receiver for a wireless microphone, in which the antenna includes a monopole or dipole antenna element for the excitation of a monopole or dipole and an additional antenna element for the excitation of a parallel plate line mode.

According to the teachings herein, a decisive improvement of the efficiency of the antenna with a dipole or monopole element can be achieved by the use of an additional antenna element which propagates the excitation of a parallel plate line mode. The additional antenna element preferably comprises two conducting elements that are parallel to each other and are spaced distance from each other, as well as, a coupling element. A useful signal feed is preferably provided via a feed point on one end of the element pair. Preferably, there is a conducting connection between the two parallel elements of the additional antenna element, e.g. in the form of spacers, which on the side facing away from the feed point, are separated by a distance that equals approximately one-quarter wavelength of the signal being fed. The tuning between the antenna and the feed electronics can thereby be advantageously adjusted by varying the distance of the conducting connection from the feed point.

Additional radiation of the useful signal can be achieved by placing the conducting connection that short-circuits the two parallel antenna elements at a distance from the feed point so that as a result, the forward and return waves are constructively superimposed in the vicinity of the feed point/coupling element and thereby produce a high field strength. As a result of the spatial separation between the grip and the origin of the fields, this additional signal radiation is also exposed to only a negligible interference by the hand of the user of a mobile transmitter and/or receiver device which is equipped with the antenna concept taught by the invention.

In one particularly practical and easily realizable preferred embodiment, the two printed circuit board elements of the additional antenna element comprise printed circuit boards that have at least one metallization coating, which preferably forms a continuous layer. At least one of these conducting plates can be formed by the printed circuit board that carries the components for the transmitter and/or receiver device.

As an alternative to this embodiment with two parallel plates or printed circuit boards, the additional antenna element can include a conducting component of the housing or a cover plate of a hand-held transmitter/receiver for the excitation of a parallel plate line mode, which performs the function of at least one of the two parallel circuit boards.

In an additional preferred embodiment in which these circuit board elements simultaneously form part of the parallel plate line and part of a monopole antenna, which means that there are two antenna types that are radiating simultaneously, the two elements of the additional antenna element can represent a portion of a monopole antenna element, whereby the arm of the monopole antenna is realized in the form of a connecting piece between the housing and a circuit board with assemblies of the mobile transmitter and/or receiver device, and a conducting grip that is attached to the housing, while the corresponding virtual electrical mirror image with inverted polarity of the first arm is formed by one or both printed circuit board(s) with at least one metallization layer.

According to one aspect of the invention, to optimize the efficiency of the antenna, the invention teaches a coupling device which, on account of its geometry, makes possible the simultaneous excitation of the monopole mode or the dipole mode and of the parallel plate line mode.

To increase the interference immunity when the user is moving, one embodiment of the invention teaches the advantageous generation of a radiation characteristic that comes as close as possible to an isotropic radiator by the controlled superimposition of the electrical fields of the monopole or dipole and of the additional antenna element to excite a parallel plate line mode.

The foregoing and other objectives and advantages of certain embodiments of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

Embodiments of the invention are explained in greater detail below with reference to the accompanying drawing, in which.

DETAILED DESCRIPTION OF THE PREFERRED EMBODIMENTS

Figure 1:
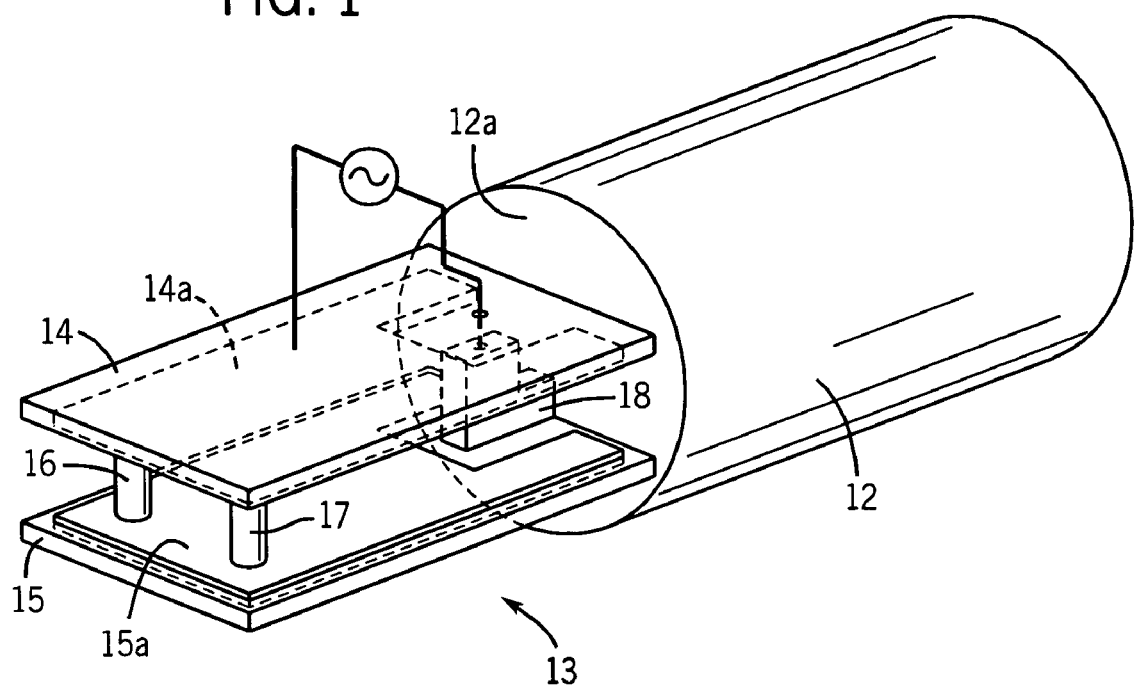
FIG. 1 shows one exemplary embodiment of the antenna as taught by the invention in the form of a component of a hand-held transmitter/receiver for a wireless microphone, the housing of which in the vicinity of the antenna is not shown.

As shown in FIG. 1, a base 10 of a hand-held wireless microphone includes an open or exposed base end 11 and an adjacent, conducting grip 12, which forms a part of a monopole antenna element. The base 10 and grip 12 form a portion of the microphone housing. In the base end 11 there is a parallel plate line antenna element 13, which is fastened to a closed end surface 12a of the cylindrical grip 12 on the coupling element 18. In the embodiment of the antenna taught by the invention in FIG. 1, two printed circuit boards 14 and 15 are spaced from each other in a parallel relation. The parallel circuit boards 14 and 15 form a parallel plate line antenna element 13 used in the antenna in addition to, or simultaneously with, the monopole antenna element.

The printed circuit boards 14, 15 are separated from each other on the end farther from the grip 12 by means of tubular spacers 16, 17 and on the grip 12 by means of a coupling device 18. As described below, the coupling device 18 allows the simultaneous excitation of the monopole field, or mode, or of the dipole field, and the parallel plate line mode. Preferably, the coupling device 18 includes a cylindrical base surface with an adjacent cuboid block for fastening to the printed circuit boards 14, 15.

The printed circuit boards 14, 15 each have a preferably substantially continuous metallization 14a, 15a in the form of at least one layer (e.g. the GND or ground layer). The two spacers 16, 17 are made of conducting material and are in contact with the metallization layers 14a, 15a. The two metallization layers 14a, 15a are thereby electrically connected on the end of the printed circuit boards 14, 15 farther from the grip 12.

Figure 2:
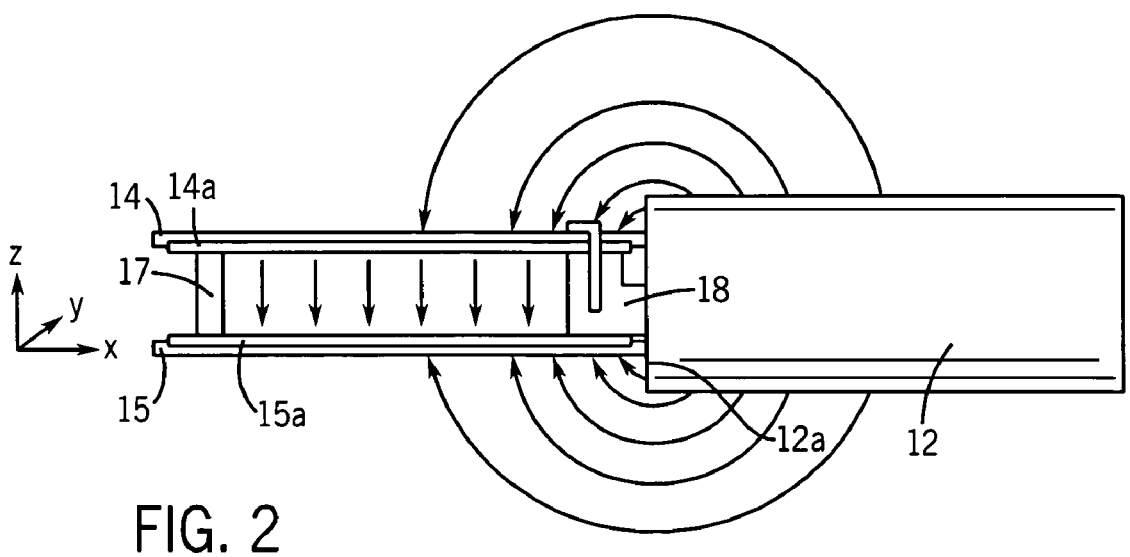
FIG. 2 shows a side view of the arrangement illustrated in FIG. 1, with a schematic illustration of the simultaneously generated parallel plate line mode and the field distribution of the monopole or dipole of the antenna.

In addition to the monopole field excited by means of the grip 12 and the parallel plate line antenna element 13, a parallel plate line mode is excited between the printed circuit boards 14, 15 by a suitable feed of the useful signal radiated into the coupling element 18 and thus into the end surface 12a of the grip 12. This parallel plate line mode is characterized by an electrical field profile which is indicated in FIG. 2 with arrows running between the printed circuit boards 14 perpendicular to the latter. The electrical field of this propagatable mode is propagated from the feed point on the coupling device 18 to the opposite end of the pair of printed circuit boards 14, 15 farther from the grip. In one embodiment of the present invention, at least one of the circuit boards 14, 15 forms a screening plate for use in a hand-held transmitter/receiver.

Figure 3:
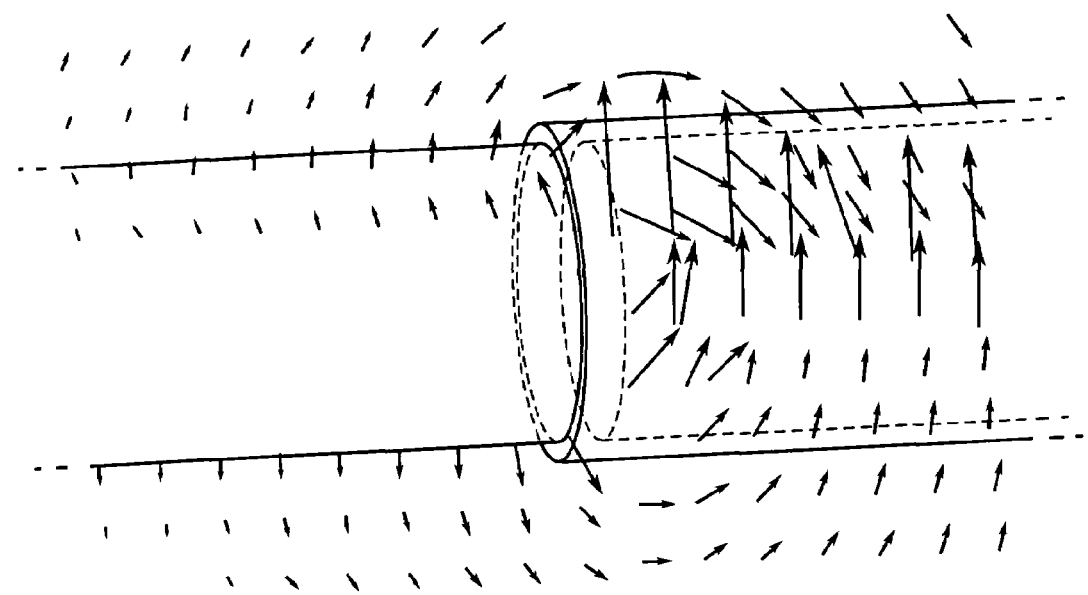
FIG. 3 shows the electrical field distribution of the antenna illustrated in FIG. 1 in the ZX plane indicated in FIG. 2.
Figure 4:
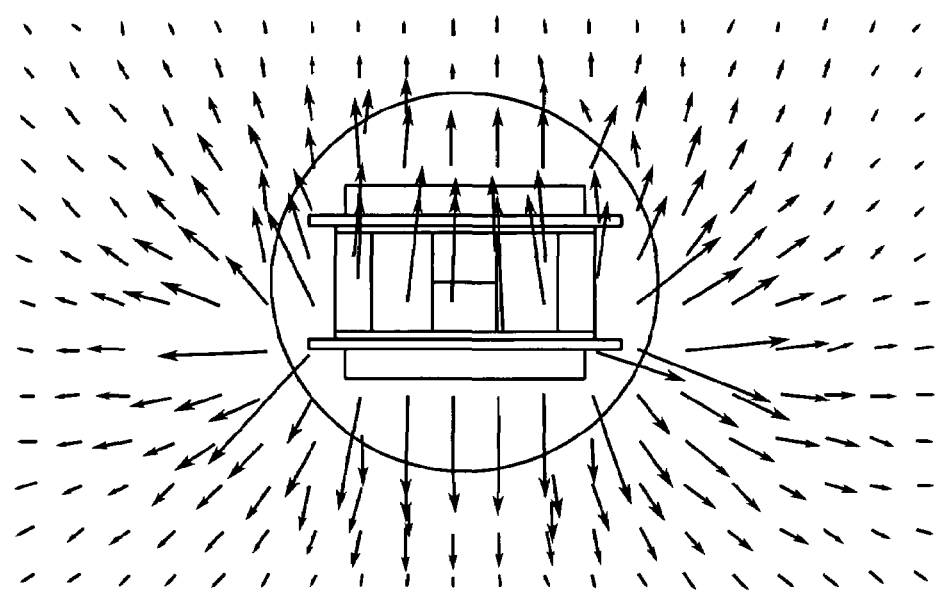
FIG. 4 shows the electrical field distribution of the antenna illustrated in FIG. 1 in the ZY plane indicated in FIG. 2.

The electrical field profile of the monopole is indicated in FIG. 2 by the curved arrows that start from the end of the grip and end at the pair of printed circuit boards 14, 15. By means of the parallel plate line mode that is excited in addition to the monopole, a good coupling and a very good radiation efficiency of typically more than 90% have been achieved in simulation by the antenna system illustrated in FIGS. 1 and 2. The electrical field distribution in the plane of the drawing in FIG. 2 is illustrated in FIG. 3 and the electrical field distribution in the radial plane with reference to the cylindrical grip 12 is illustrated in FIG. 4, where the length of the arrows that embody the field lines is an indication of the respective local field strength.

Figure 5:
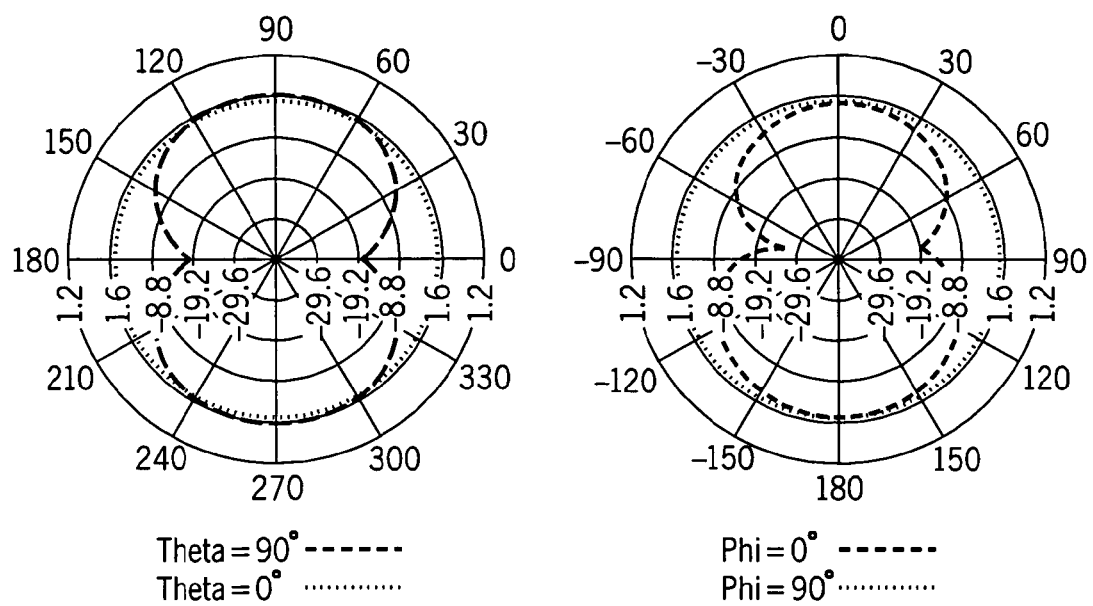
FIG. 5 shows antenna characteristics of the antenna illustrated in FIG. 1.
Figure 5:
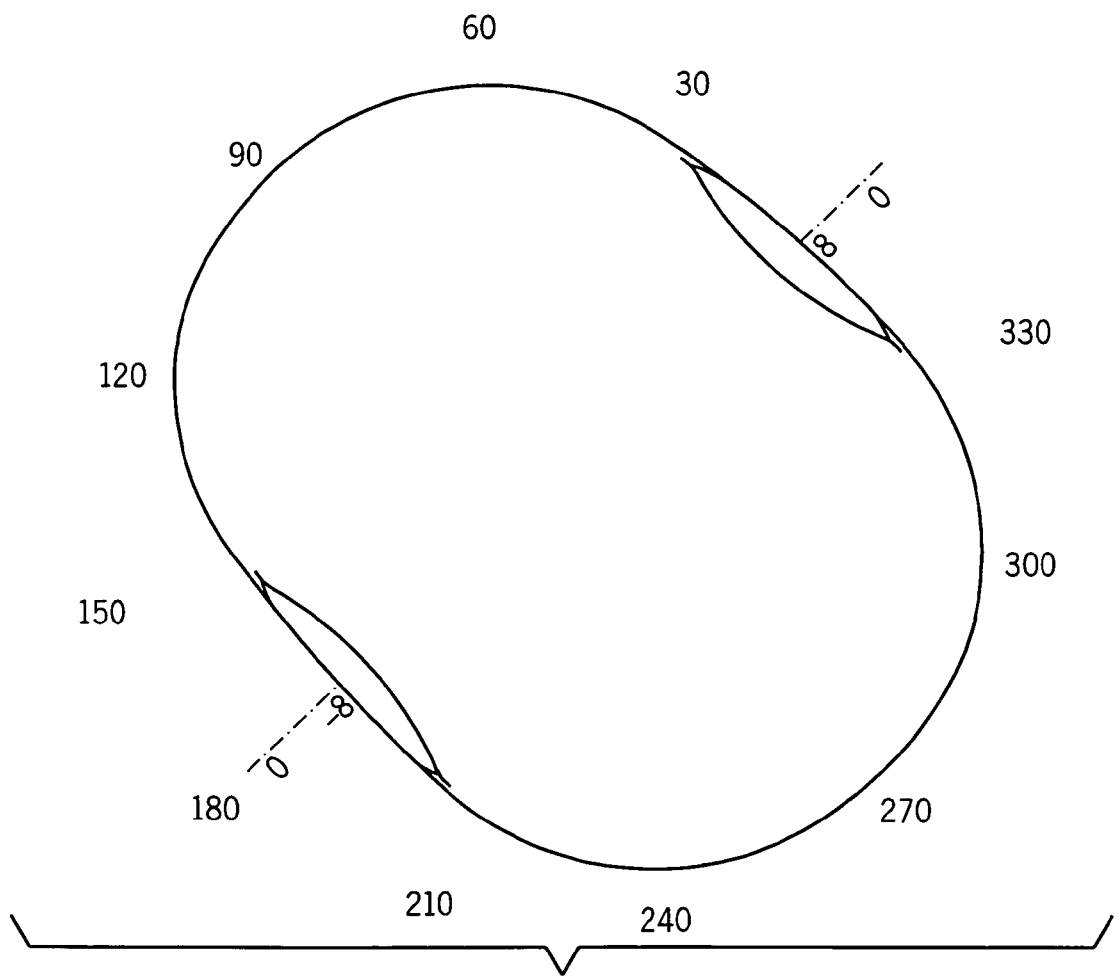
Figure 7:
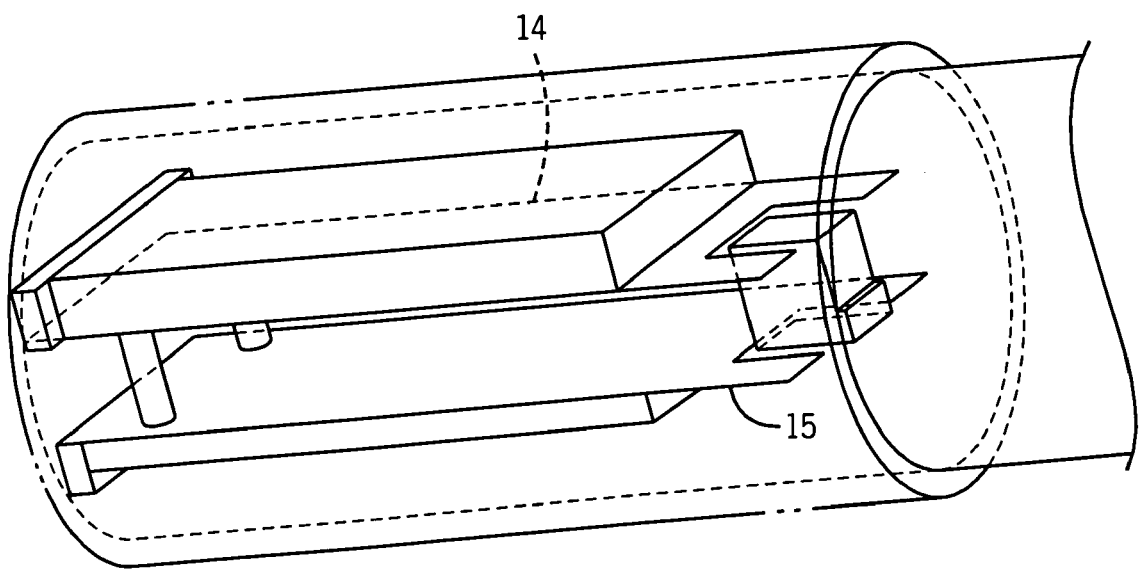
FIG. 7 shows the current distribution in the ground plane of the antenna illustrated in FIG. 1.

The antenna characteristics of the antenna array illustrated in FIGS. 1 and 2 are shown in FIG. 5. In the figure, the electrical field is distributed uniformly in all directions perpendicular to the X axis. In the Y/Z-plane illustrated in FIG. 5, a perfect omnidirectional characteristic is achieved. This fact is underlined by a low overall (including Y/Z, X/Z, and X/Y planes) directivity of approximately 3.4 dB. In both directions of the X axis, field troughs are visible, but they are desirable because they point toward the users head. This current distribution also turns out to be very homogeneous within the base or ground plane, as shown in FIG. 7, which is accompanied by a low SAR (Specific Absorption Rate).

In the exemplary embodiment of the antenna taught by the invention illustrated in FIGS. 1 and 2, the printed circuit boards 14, 15 include components (not shown) of the circuitry for the acquisition and processing of the useful signal. As noted above, the two printed circuits boards 14, 15 are located at some distance from each other. The ground planes 14a and 15a are electrically connected by means of the two conducting spacers 16, 17, whereby these spacers represent a short circuit of the parallel plate line. This short circuit causes the formation of a standing wave inside the parallel plate line that has a minimum in the vicinity of the spacers 16, 17 and a maximum in the vicinity of the feed/coupling element.

Figure 6:
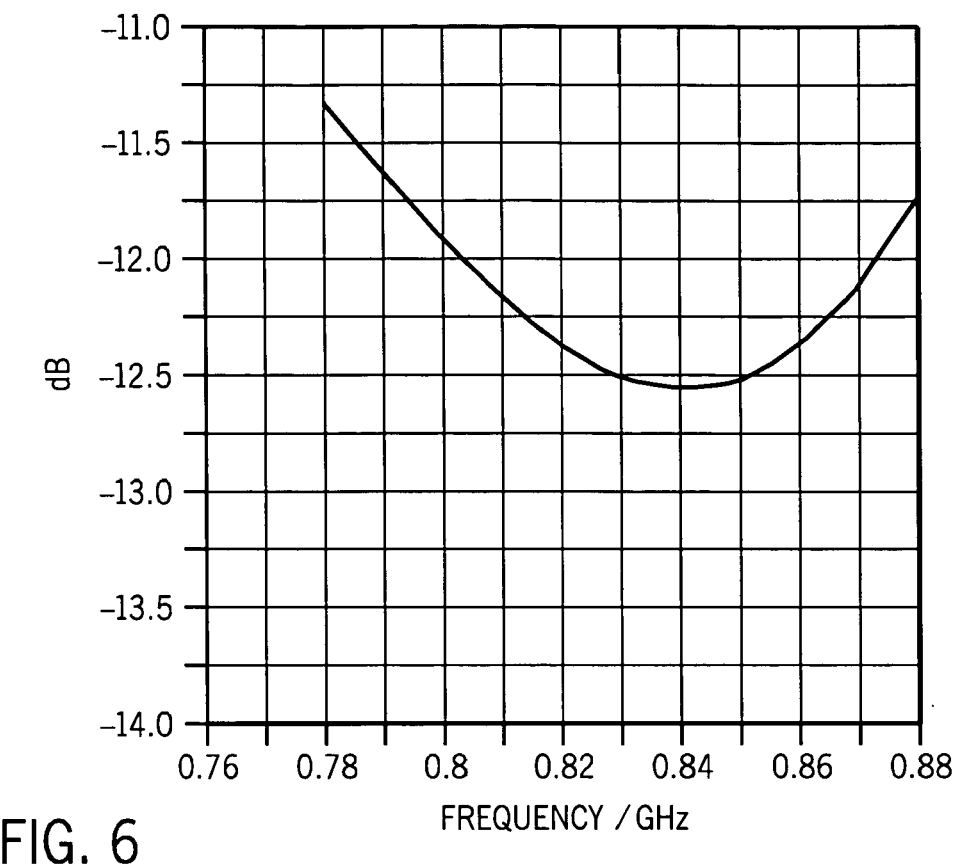
FIG. 6 shows the tuning characteristics of the antenna illustrated in FIG. 1.

On account of the constructive superimposition of the forward and reverse waves taught by the invention, a strong electrical field is formed (FIGS. 3 and 4) which leads to an improvement of the radiation of the monopole described above. As the example shows, an optimization of the broadband tuning (FIG. 6) can be achieved by modifying the distance of the spacers 16, 17 from the feed point. Preferably, a slot is left between the block and cylinder of the coupling device 18 to allow tuning optimization. Advantageously, because of the position of the field superelevation significantly in front of the grip 12, the influence of the user's hand that is gripping the microphone at that point is very small, because in particular only the field of the monopole is influenced.

Figure 8:
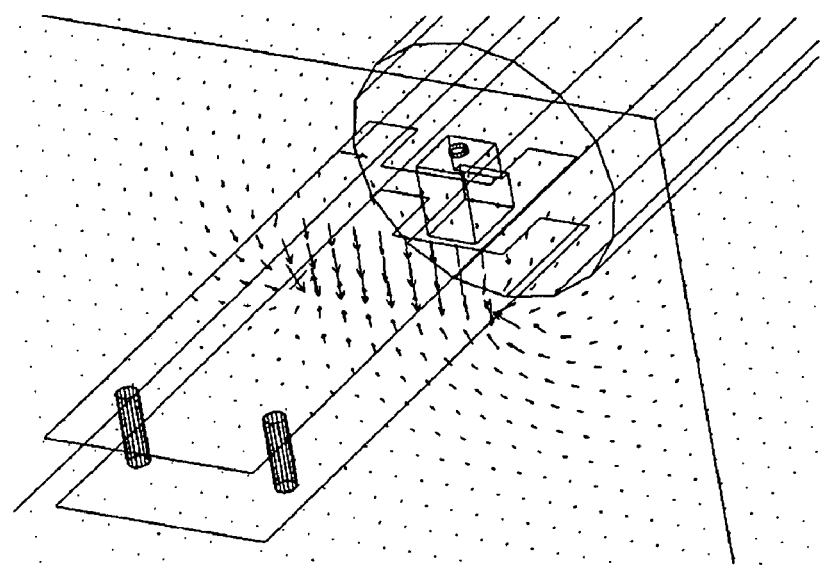
FIG. 8 shows the field distribution of the antenna illustrated in FIG. 1 during the simultaneous excitation of the parallel plate and monopole modes.
Figure 9:
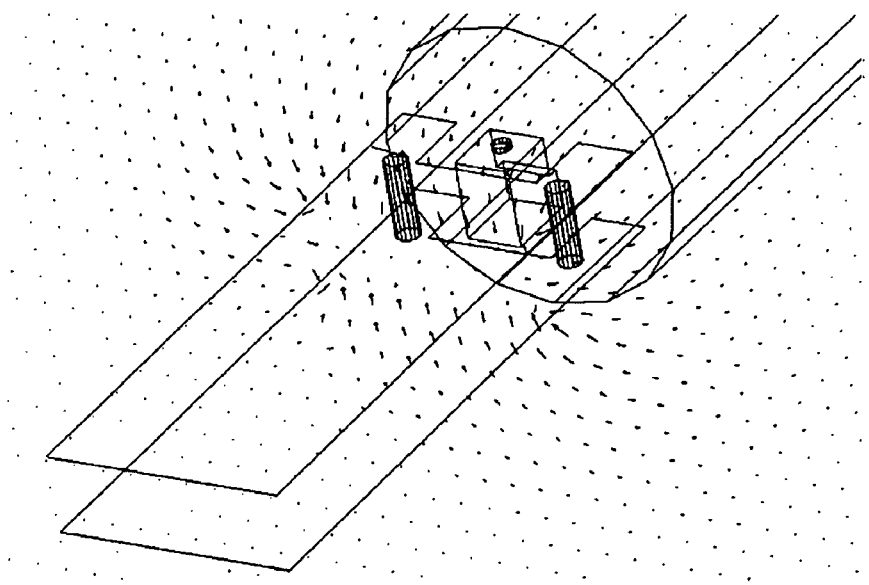
FIG. 9 shows the field distribution of the antenna illustrated in FIG. 1 with the parallel plate line short-circuited.

FIG. 8 shows the field distribution achieved with the antenna arrangement illustrated in FIGS. 1 and 2 when the parallel plate line mode and the monopole mode are excited with a short circuit at the distance of a quarter wavelength. By comparison, FIG. 9 shows the field distribution with the excitation of the monopole mode only, which in the prior art is observed without excitation of the parallel plate line mode on the basis of the antenna array illustrated in FIGS. 1 and 2 with a parallel plate line "short-circuited" on the input side by the location of the spacers at the level of the feed point.

While there has been shown and described what is at present considered the preferred embodiment of the invention, it will be obvious to those skilled in the art that various changes and modifications can be made therein without departing from the scope of the invention defined by the appended claims.

We claim:

1. An antenna for a mobile transmitter, receiver, or transmitter/receiver device, said antenna comprising:
    a monopole or dipole antenna element exciting a monopole or dipole; and
    an additional antenna element simultaneously exciting a parallel plate line mode, wherein the additional antenna element comprises two conducting elements that are parallel to one another and at some distance from one another, and wherein the two parallel conducting elements of the additional antenna element are two printed circuit boards with at least one metallization layer.

2. The antenna as claimed in claim 1, further comprising:
    a coupling element on one end of the two parallel conducting elements.

3. The antenna as claimed in claim 2, further comprising:
    a conducting connection provided between the two parallel conducting elements wherein the conducting connection is located at a distance of approximately one-quarter wavelength from the coupling element, and wherein the conducting connection electrically connects the two conducting elements to one another.

4. The antenna as claimed in claim 3, characterized by an adjustability of the tuning between antenna and feed electronics by varying the distance of the conducting connection from the coupling element.

5. The antenna as claimed in claim 3, characterized in that the conducting connection short circuits the parallel plate line formed by the two parallel elements and on account of constructive superimposition of forward and return waves generates a high field strength in the vicinity of the coupling element to the benefit of additional signal radiation.

6. The antenna as claimed in claim 1, characterized in that said at least one metallization layer is substantially continuous.

7. The antenna as claimed in claim 1, characterized by the fact that by a controlled superimposition of the electrical fields of the monopole or dipole and of the additional antenna element, a radiation characteristic that approximates an isotropic radiator.

8. The antenna as claimed in claim 1, wherein the device is a wireless microphone.

9. An antenna for a mobile transmitter, receiver, or transmitter/receiver device, said antenna comprising:
    a monopole or dipole antenna element exciting a monopole or dipole; and
    an additional antenna element simultaneously exciting a parallel plate line mode;
    wherein the antenna is a component of a hand-held transmitter/receiver which comprises a housing, characterized in that at least one of the two elements of the additional antenna element includes a conducting component of the housing, and wherein at least one of the two elements of the additional antenna element is part of a monopole antenna element, whereby a first arm of the monopole antenna is realized by a connecting piece between the housing and a circuit card with components of the mobile transmitter and/or receiver device and a conducting grip that is attached to the housing, while the corresponding virtual electrical mirror image with inverted polarity of the first arm is formed by at least one printed circuit board with at least one metallization layer.

10. An antenna for a mobile transmitter, receiver, or transmitter/receiver device, said antenna comprising:
    a monopole or dipole antenna element exciting a monopole or dipole;
    an additional antenna element simultaneously exciting a parallel plate line mode, wherein the antenna is a component of a hand-held transmitter/receiver, which comprises a screening plate, characterized in that at least one of the two elements of the additional antenna element comprises the screening plate; and
    a coupling device which, on account of its geometry, makes possible simultaneous excitation of either the monopole or the dipole and of the parallel plate line mode, wherein the coupling device has a cylindrical base surface with an adjacent cuboid block for fastening to printed circuit boards.

11. The antenna as claimed in claim 10, further comprising:
    a slot is between the block and cylinder base surface to optimize tuning.

12. An antenna system comprising:
    an antenna comprising at least one selected from the group consisting of a dipole antenna and a monopole antenna having a longitudinal axis, wherein the antenna is part of a handheld wireless microphone; and
    a parallel plate element coupled to the antenna, wherein the parallel plate element is positioned with respect to the antenna such that the array has a lesser directionality than the antenna alone would have, wherein the parallel plate element comprises a first conductive planar element and a second conductive planar element, wherein the first and second conductive planar elements are coplanar to one another and parallel to the longitudinal axis of the antenna, and wherein the first and second conductive planar elements have approximately the same area.

13. An antenna system according to claim 12, wherein both the antenna and the parallel plate element are designed to operate in the same frequency band.

14. A method for decreasing the directional sensitivity of a first antenna element comprising at least one selected from the group consisting of a dipole antenna and a monopole antenna, the method comprising:
    exciting a parallel plate line mode while simultaneously energizing the first antenna element, thereby causing constructive superimposition with the electromagnetic waves emanating from the first antenna element so as to more evenly distribute energy from the electromagnetic waves in all directions than the first antenna element alone would do, wherein the parallel plate line mode is excited between two conducting elements that are parallel to one another and at some distance from one another, and wherein the two parallel conducting elements of the additional antenna element are two printed circuit boards with at least one metallization layer.

* * * * *